Feb. 20, 1951 M. RAVERA 2,542,880

CONDITION-RESPONSIVE APPARATUS FOR CALLING PRESELECTED TELEPHONE NUMBERS

Filed March 13, 1947 2 Sheets-Sheet 1

INVENTOR:
MICHELE RAVERA
BY Curt M. Avery ATTY.

INVENTOR:
MICHELE RAVERA
BY: [signature] ATTY.

Patented Feb. 20, 1951

2,542,880

UNITED STATES PATENT OFFICE 2,542,880

CONDITION-RESPONSIVE APPARATUS FOR CALLING PRESELECTED TELEPHONE NUMBERS

Michele Ravera, Genoa, Italy

Application March 13, 1947, Serial No. 734,382
In Italy March 14, 1946

9 Claims. (Cl. 179—5)

My invention relates to protective alarm apparatus which call a preselected telephone station and connect it with telephone apparatus at the place to be protected in response to an automatic detection of a given irregularity.

Such protective apparatus may serve to automatically report burglary, fire or any irregularity capable of being converted, by a detector, into a variation of an electric magnitude. The place subject to supervision by the apparatus may be a residence, premises for commercial activities, a storeroom or warehouse, a financial institution or any other building, while the receiving telephone to be called may be the residence of the owner or tenant of the premises being supervised, or a police or fire station. Depending upon whether the apparatus serves to signal burglary or fire, the appertaining detector may operate with thermo-electric elements, thermo-relays, beams of invisible rays or similar devices that produce or control electrical impulses or the opening or closing of electric circuits.

Apparatus according to the invention are characterized by the fact that a mechanism operated, for example, by means of springs or weights, has starting and stopping positions determined by means of a Geneva gear and commences to operate when a starting magnet is excited, and then actuates contacts which cause the apparatus to be connected to an existing telephone circuit while simultaneously switching the local telephone instrument out of this circuit. Thereafter, the apparatus issues trains of impulses corresponding to a preselected telephone number and completes the telephonic connection when the called subscriber answers while, if desired, switching one or a plurality of microphones into the telephone circuit. Apparatus according to the invention permit satisfying the objects and achieving the advantages mentioned presently. Such apparatus require virtually no maintenance servicing and normally consume no current. A standard dry cell of modest capacity is sufficient to feed the local protective network. Thanks to its small dimensions and silent operation, the apparatus can be accommodated at any suitable, concealed point on the premises to be protected and may remain permanently connected to the telephone circuit, from which, however, it can at any time be disconnected at will by means of a simple change-over switch. Connecting the apparatus to the telephone circuit is extremely simple. It is sufficient, for this purpose, to sever one of the leads and insert the apparatus, or to wire it to the leads, depending upon whether the apparatus is normally in readiness for action or in its state of rest. A bridging contact normally secures continuity of the circuit for the telephone instrument, so that the normal use of the telephone is in no way interfered with. The telephone instrument is only switched out of circuit at the moment when the apparatus comes into operation. To resume normal telephone communications, the apparatus is reset or the above-mentioned change-over switch is operated. The apparatus is ready for service at any time. The calling of the preselected and preset telephone number can take place once only or several times in intervals. Each time the call is effected, the bell or buzzer of the called instrument functions repeatedly. The apparatus can be so set or arranged that, after the last repetition of the called telephone number, either the bell or buzzer of the called instrument ceases operating or, if preferred, continues to function until the receiver is lifted. Between the individual calls, a telephone connection can be established from the calling or the called instrument to any other subscriber, for instance, the police or fire department. If desired, the apparatus can be fitted with one or more additional microphones so that noise on the protected premises can be listened to through the called instrument.

When a call is initiated by the apparatus and the reeciver of the called telephone is lifted, a characteristic signal can be heard at the latter, making this call distinct from an ordinary call. When the receiver is lifted, the apparatus continues to send out the same impulses as were used to compose the called telephone number, or alternatively therewith a continuous succession of uniform impulses is transmitted. The preselected telephone number can readily be changed at any time.

The apparatus can be made to perform its functions as an alarm transmitter even if the telephone circuit has been rendered unusable through cutting or shorting of the leads. For this purpose, a local electro-acoustic alarm system may be connected to the apparatus so that this alarm system becomes operative only when the telephone line is unusable. Furthermore, the apparatus can be so arranged that, after the last call, it ceases to function, leaving the telephone line either blocked or free as desired.

The following is a description of an embodiment of the invention illustrated in the drawing.

Figure 1:
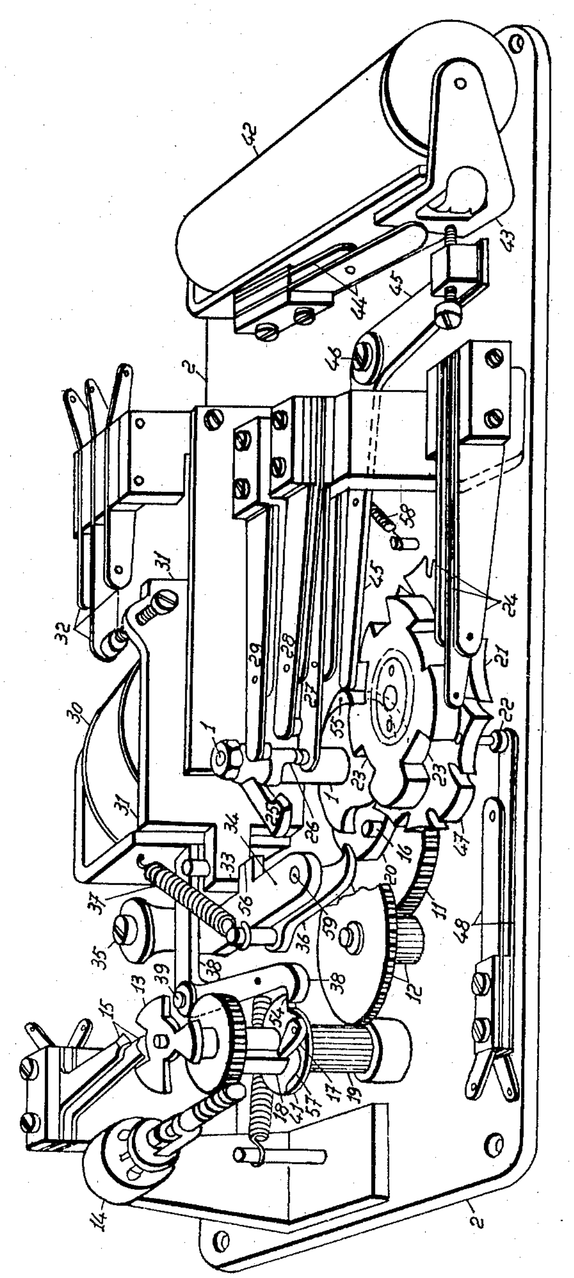
Figure 1 shows in perspective the parts of the apparatus mounted on one side of a mounting plate.

A shaft 1 passes through a plate 2 (Fig. 1) which carries the whole apparatus. A knob 3 (Fig. 2) on shaft 1 serves to set the apparatus for action. Knob 3 and the operating lever 4 (Fig. 2) of a control or change-over switch 5 are the only parts of the apparatus that are visible and accessible at the outside of the casing or housing (not shown). The apparatus is preferably set for action by manually turning the knob so as to wind up a coiled spring 6. Shaft 1 carries a cam disc 7 (Fig. 2) which operates a contact 9 through an arm 8. A terminal bar 10, having five pairs of terminals 49 to 53 (Fig. 3), serves for connecting the apparatus to the telephone circuit and the various other circuits described below. On the other side of plate 2 (Fig. 1), shaft 1 carries a gear-wheel 11 which, through an intermediate gear 12, drives a contact maker or pulse transmitter which is similar in construction and functioning to the known types of pulse contactors used in standard telephone instruments. A cam disc 13 of this contact maker operates, at regular intervals controlled by a speed governor 14, a pulse contact 15 and is rotated in one direction through a freewheeling device. The freewheeling device has a spring-loaded pawl 17 which engages an axial recess of the shaft 18 which carries the cam disc 13. Pawl 17 is pivoted on a pinion 19 driven from shaft 1 through gear-wheels 11 and 12. Pinion 19 and pawl 17 drive the cam disc 13 as long as shaft 1 is rotating in the direction determined by the expansion of spring 6, but are disengaged from shaft 18 and hence run idle while the spring 6 is being wound up. It is obvious that pawl 17 can also be so arranged as to rest on one of the two gear-wheels 11 and 12. Mounted on shaft 1 is also the control wheel or driver 20 of a Geneva gear. The driven member 21 of this gear has an attachment 22 which operates an electric contact 48. The shaft of the Geneva gear member 21 carries a cam disc 23 which periodically operates a make-and-break contact 24. The shaft 1 carries two arms 25 and 26 which when rotating, operate contacts 27, 28 and 29.

The starting device of the apparatus consists of an electro-magnet 30 which, when under current, attracts an armature 31. Armature 31 controls a make-and-break contact 32 and determines by an extension 33 the position of an arm 34 rotatable about a pivot 35. Arm 34 carries a lever (blocking member) 36 pivotally mounted at 59. Lever 36 is normally held by a spring 37 in the position shown in Fig. 1. The extension 33 further determines the position of a bell-crank lever 38 which is pivoted at 39 and is loaded by a spring 40. Lever 38 cooperates with a locking tooth 54 at the periphery of a disc 41 appertaining to the above-mentioned freewheeling device. The apparatus has a relay 42 whose armature 43 controls a contact 44 and simultaneously determines the position of a bell-crank lever 45 pivotally mounted at 46. Depending upon the position of lever 45, the movement of control wheel 20 is locked or released due to a catch or stop 55 located on the control wheel 20.

Figure 2:
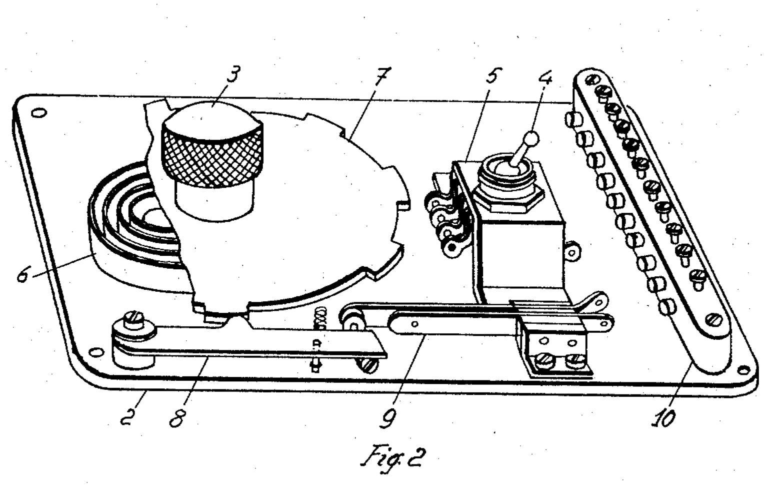
Fig. 2 shows in perspective the parts of the apparatus mounted on the other side of the mounting plate.
Figure 3:
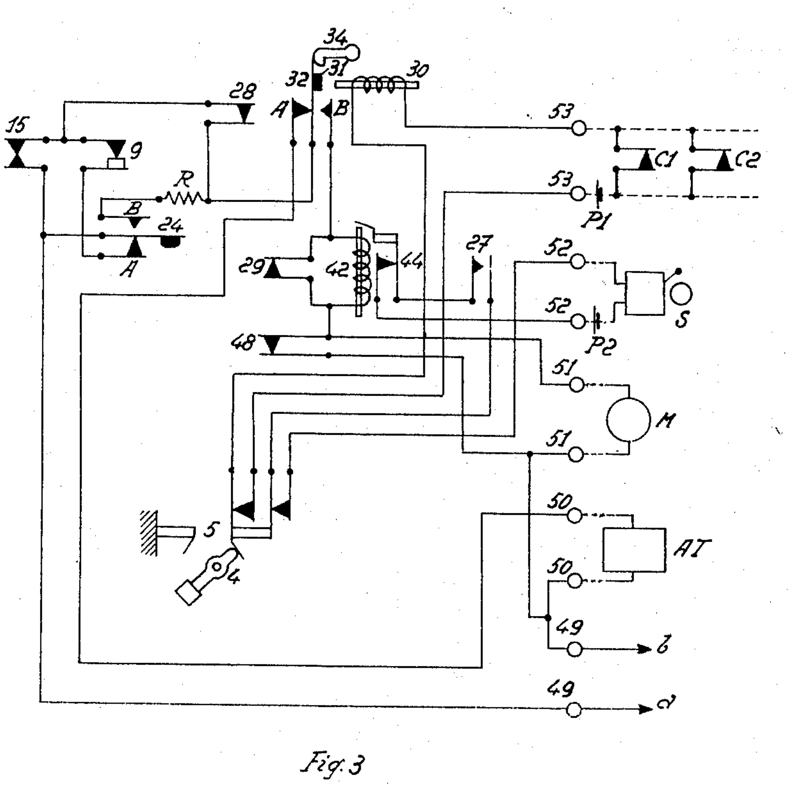
Fig. 3 shows a wiring diagram for the apparatus.

The operation of the apparatus will now be described with reference to its use, for instance, for burglar alarm purposes. The room to be protected is provided in the known manner which a protective network or alarm system whose contacts, such as those shown at $c_1$ and $c_2$ (Fig. 3), are suitably attached near doors and windows. To set the apparatus for action, the spring 6 is wound up by means of the knob 3 (Fig. 2). At each revolution of the knob the Geneva gear member 21 (Fig. 1) is moved one step. One tooth 47 of the member 21 has a shape different from that of the other teeth so that it cannot pass by the control wheel 20. Tooth 47, by abutting against wheel 20 determines the maximum extent to which the spring can be wound up. When the spring is wound up, all moving members of the apparatus are set in a given initial position precisely determined by tooth 47. In this position, the lever 38 locks the disc 41, and through the latter, the entire mechanism. The contact 32, which is controlled by the electro-magnet 30, is closed in position A (Fig. 3). The telephone instrument AT is normally connected across leads *a* and *b* in the circuit: lead *a*, closed contacts 15 and 28, contact 32 in position A, telephone instrument AT, lead *b*. With lever 4 of switch 5 in the position shown in Fig. 3, the protective or alarm network for contacts $c_1$, $c_2$ . . . and a local alarm circuit comprising an audible signalling device S are connected to the apparatus. These two circuits are fed by two batteries $P_1$ and $P_2$, respectively, for which a single battery can be used, in which case the two contacts of switch 5 are also reduced to one.

As soon as, due to opening of a door or window, the protective network is closed by any of its parallel-wired contacts $c_1$, $c_2$ . . . , the electro-magnet 30 is excited and attracts its armature 31. The contact 32 controlled by the armature is switched over from position A to position B, whereby the telephone instrument AT is switched out of the circuit and the apparatus is switched into the telephone circuit.

The arm 34, whose nose 56 up to this moment had been bearing against the extension 33 of armature 31, is released. Hence, arm 34 under the bias of spring 37, follows the armature and holds the latter locked in its attracted position even if subsequently the exciting current supplied by battery $P_1$ fails. Simultaneously the bell-crank lever 38, which, when the electro-magnet 30 is dead, bears against the extension 33 of the core 31, is deflected by the motion of the armature and releases the disc 41 and with it the entire mechanism. Shaft 1 commences to rotate. The arm 26 on shaft 1 opens contact 29 and switches relay 42 into the following circuit: lead *a*, closed contacts 15 and 28, contact 32 in position B, relay 42, closed contact 48, lead *b*. Relay 42 is excited and attracts its armature 43. Relay contact 44 is opened, and bell-crank lever 45 is deflected from the path of the stop or cam 55 of control wheel 20. Immediately thereafter, the contact 27, which is switched into the local alarm circuit connected to the pair of terminals 52, is closed by the same arm 26 on shaft 1. The audible signalling device S, however, does not operate because its circuit is still broken at the open contact 44 of relay 42 (Fig. 3). In a next moment, the same arm 26 opens contact 27 again and closes contact 29. Relay 42 is excited and closes its contact 44. At this moment, the emission of trains of impulses corresponding to the preselected telephone number commences as described in a later place.

Should the connecting telephone leads be inoperative for any cause, relay 42 cannot be excited and its contact 44 remains closed. Lever 45 is not deflected, and as soon as the cam or stop 55 of control wheel 20 strikes against lever 45, the entire mechanism is again locked shortly after it has been set in motion. Arm 26 has now come to a standstill directly on contact 27, and contact 27 closes. Since contact 44 of relay 42 is also closed, the local alarm circuit is closed, and the audible signalling device S (Fig. 3) gives a local alarm.

Assuming that the connecting leads are intact, the emission of the trains of impulses corresponding to the preset telephone number occurs in the following manner. From the moment at which the apparatus becomes operative, cam disc 13 rotates at a uniform speed and creates, through the periodic opening and closing of the impulse contact 15, an uninterrupted train of uniform impulses. In parallel with impulse contact 15, however, lies another contact 9 (Fig. 3), so that, disregarding for a moment a further contact 24, impulses can only be transmitted during periods in which contact 9 is in its open position. Contact 9 is operated by the cam disc 7 (Fig. 2), whose profile thus determines the times and duration of the successive openings and closings of contact 9 and thus determines also the chronometric succession and composition of the trains of impulses through which finally the composition of the telephone number to be called is determined. Each telephone number thus calls for a cam disc 7 with a specific profile, and if the telephone number is changed, the cam disc is changed also, for which purpose it can easily be removed by unscrewing the knob 3. These discs can be shaped and manufactured in various ways. The cams can be worked into the material of the disc itself, or they can be added to the disc and secured to it by fastening means, for instance, screws. In the latter case, a modification of the relative positions of the cams is sufficient to set the disc for a different telephone number. The opening of the contact 9 operated by disc 7 can be effected by the cams or by the gaps separating the cams. In the embodiment here selected as an example, the opening of contact 9 is effected by the gaps separating the cams, and the number and dimensions of these gaps are, therefore, selected according to the number and numerical value of the figures composing the telephone number to be called. On the other hand, the cams are all of the same length, through which they determine the duration of the intervals which must of necessity separate one figure or digit from the other.

As mentioned, each complete revolution of disc 7 causes the transmission of impulses in accordance with the preselected telephone number. To prevent these calls from succeeding each other at too frequent intervals, it is advantageous to arrange for a pause between successive calls. This can be achieved by providing one or several idle revolutions of the cam disc 7. In the case here considered, one calling revolution of the cam disc 7 alternates with one idle revolution. This is achieved by means of the cam disc 23 (Fig. 1) located on the shaft of the Geneva gear member 21. The cams of disc 23 switch the contact 24 intermittently from the A position to the B position and thus close a shunt path across contacts 15 and 28 (Fig. 3). The number of cams on disc 23 is half the number of the teeth on gear member 21, and as the latter moves one tooth for each revolution of disc 7, it follows that contact 24 is operated, in the manner described above, every second revolution of disc 7. By selecting a different ratio between the number of teeth on gear member 21 and the number of cams on disc 23, the duration of the pauses separating the individual calls can be correspondingly adjusted. During these pauses, however, the contact 24 in its B position forms no direct short-circuit for the impulse contact 15, because the shunt path through contact 24 includes a resistance R (Fig. 3). The value of this resistance is so selected that the impulses produced at contact 15 during the pauses reach the telephone exchange in a condition weakened to such an extent that the exchange equipment is not affected by them, but the impulses retain sufficient strength to be clearly audible at the called telephone instrument. This makes it possible for the subscriber at the called telephone to distinguish acoustically between these alarm calls and a normal call.

At the end of each pause, the contact 24 reoccupies its A position, and arm 25 temporarily opens the contact 28 and releases the telephone line for use so that the called subscriber can ring up another subscriber, such as a police station. If the called subscriber fails to answer, the line is reoccupied on the reclosing of contact 28, and the call is repeated.

After a given number of revolutions of the cam disc 7, for instance nine, corresponding to five calls and four pauses, the entire mechanism is halted in a position determined by the tooth 47 of the Geneva gear. This position corresponds to that in which the attachment 22 of the Geneva gear bears against contact 48 and, by opening this contact, switches one or several microphones M (Fig. 3) into the circuit. This permits the listener at the called telephone to hear any noise in the room or premises to be protected.

When the apparatus ceases to operate, the armature 31 of electro-magnet 30 remains locked by arm 34. The armature 31 is released during the subsequent rewinding of the spring 6. The release is effected by the lever 36 whose free end lies in the path of the pin 16 on control wheel 20 which propels the Geneva gear member 21 (Fig. 1). While the apparatus is operating, pin 16 rotates clockwise and, during each revolution, strikes against the end of lever 36 and compels the latter to turn about its pivot 59, without thereby affecting the position of the arm 34. After the spring 6 is wound up, the pin 16 rotates in the opposite direction, and on its first contact with the lever 36, deflects the latter together with arm 34, thus releasing the armature 31 which then snaps back to its open position.

The apparatus according to the invention can be modified as to form and disposition of its members without departing from the spirit of the present invention.

Some of the possible modifications have been mentioned in the foregoing. It should further be remarked that the apparatus can be considerably simplified by allowing the audible signalling device S to come into operation even when the telephone leads are intact. In this case, contacts 27 and 29, the arm 26 which operates these contacts, the relay 42 and the lever 45 become superfluous. Contact 27 can be operated directly by the armature 31 of the electromagnet 30 simultaneously with contact 32.

The apparatus can further be modified so that the audible signalling mechanism of the called telephone ceases to operate after the last call, thus finally clearing the line. For this purpose, it is sufficient to increase the number of teeth on the Geneva gear member 21 by one and, dispensing with the microphone M, to allow the last calling rotation of the cam disc 7 to be followed by an idle rotation.

By increasing the capacity of the spring 8, the number of calls can be increased to any desired extent. Finally, by suitable modifications, the apparatus described in the foregoing can also be used to advantage as an automatic call redirection switch, i. e., for the automatic redirection of calls intended for a particular telephone to another predetermined telephone.

What I claim as my invention and desire to secure by United States Letters Patent is:

1. Apparatus for automatically calling a predetermined telephone number, comprising terminals for connection to a telephone line, means including a pulse contactor connected to said terminals for issuing number pulses, a drive having gear means in driving connection with said contactor, electromagnetic means for controlling said drive to start operating said means for issuing number pulses, means responsive to an external condition for operating said electromagnetic means, a Geneva gear, means including a driver connected with said gear means for driving said Geneva gear, an intermittently rotatable driven gear member, means including said Geneva gear for driving said driven gear member, a cam disc, means operating said cam disc in predetermined time-relation with said driven member, and means including contacts mechanically controlled by said cam disc and connected with said contactor for interrupting the number pulse transmission in given positions of said driven member.

2. Apparatus for automatically calling a predetermined telephone number, comprising terminals for connection to a telephone line, means including a pulse contactor connected to said terminals for issuing number pulses, a drive having gear means in driving connection with said contactor, electromagnetic means for controlling said drive to start operating said means for issuing number pulses, means responsive to an external condition for operating said electromagnetic means, a Geneva gear means including a driver connected with said gear means for driving said Geneva gear, an intermittently rotatable driven gear member, means connecting said Geneva gear and driven member, a microphone switching means for connecting when actuated a microphone to said terminals, and control means operatively associated with said driven gear member for actuating said switching means when said driven member has moved a given number of steps.

3. Apparatus for automatically calling a predetermined telephone number, comprising terminals for connection to a telephone line, means including a pulse contactor connected to said terminals for issuing number pulses, means including a spring drive having a main shaft and a power spring disposed about said shaft, means whereby said spring is wound up by revolution of said shaft, means gearing said drive to said contactor for actuating said contactor when released, latching means for arresting said drive in wound-up condition, means including an electromagnet for controlling said latching means to release said drive, means including a Geneva gear having a driver connected with said drive and disposed on said main shaft, and comprising a stepwise rotatable driven member engageable by said driver, means including contacts controlled by said driven member and connected with said contactor for interrupting the number pulse transmission in given spaced positions of said driven member, and telephonic means connected by said contact-including means with said terminals in other positions of said driven member.

4. Apparatus for automatically calling a predetermined telephone number, comprising terminals for connection to a telephone line, means including a pulse contactor connected to said terminals for issuing number pulses and comprising a cam member for determining a preselected telephone number to be called by said pulses during one revolution of said cam member, means including a spring drive having a main shaft and a power spring disposed about said shaft to be wound up by revolution of said shaft, a pinion disposed on said shaft and geared to said contactor, and latching means for arresting said drive in wound-up condition, means including an electromagnet for controlling said latching means to release said drive, means including a Geneva gear having a driver and a stepwise rotatable driven member engaged by said driver, said driver and said cam member being disposed on said shaft and operatively associated with said pinion to rotate together therewith, and contact means including contacts controlled by said driven member to be actuated in given positions of said member.

5. Apparatus according to claim 4, characterized by said means including said driven member comprising a stop tooth on said driven member abuttable against said driver to determine the start and stop positions of said drive, means including a contact device for connecting when actuated a microphone to said terminals, and control means mechanically associated with said driven gear member for actuating said contact device only when said drive reaches the stop position.

6. Apparatus according to claim 3, comprising means including a spring biased blocking member engageable with said latching means for holding it in released position after release of said drive, and resetting means operatively associated with said Geneva gear for resetting said blocking member to permit latching of said drive when said gear reverses due to winding up of said spring.

7. Apparatus according to claim 3, characterized by said electromagnet having an armature for placing, when attracted, said latching means in releasing position, means including a pivotally mounted arm spring-biased toward engagement with said armature for holding it in attracted position after energization of said electromagnet, and a spring-biased releasing member pivotally mounted on said arm for entraining it to release said armature when said releasing member is moved in a given direction, said driver of said Geneva gear having means engageable with said releasing member so as to move said releasing member in said direction when said spring is being wound up.

8. Apparatus according to claim 1, comprising additional contact means including contacts for disconnecting said contactor during intervals between number pulse trains in order to then clear the telephone line, and means including a movable actuating member engageable with said additional contact means for actuating the latter and associated with said Geneva gear to be controlled thereby.

9. Apparatus according to claim 1, comprising a relay, means for connecting said relay to said terminals under control by said electromagnetic means so as to respond to line current when said electromagnetic means are energized, means including a locking member disposed for locking said drive and controlled by said relay so as to release said drive only when said relay is in responsive condition, terminals for a local alarm circuit, and additional contact means including contacts controlled by said relay and by said electromagnetic means for closing said alarm circuit when said electromagnetic means are energized at times of line current failure.

MICHELE RAVERA.

REFERENCES CITED

The following references are of record in the file of this patent:

UNITED STATES PATENTS

| Number | Name | Date |
|---|---|---|
| 825,623 | Webster | July 10, 1906 |
| 969,393 | Nolen | Sept. 6, 1910 |
| 982,052 | Goldstein | Jan. 17, 1911 |
| 1,029,577 | Clement | June 11, 1912 |
| 1,063,096 | Williamson | May 27, 1913 |
| 1,089,404 | Erickson | Mar. 10, 1914 |
| 1,306,074 | Moran | June 10, 1919 |
| 1,722,447 | Weyler | July 30, 1929 |
| 1,921,615 | Garl | Aug. 8, 1933 |
| 2,159,650 | Alker | May 23, 1939 |